Feb. 14, 1956 V. F. KRONER 2,734,555
SEATS FOR USE BY FISHERMEN
Filed May 22, 1952
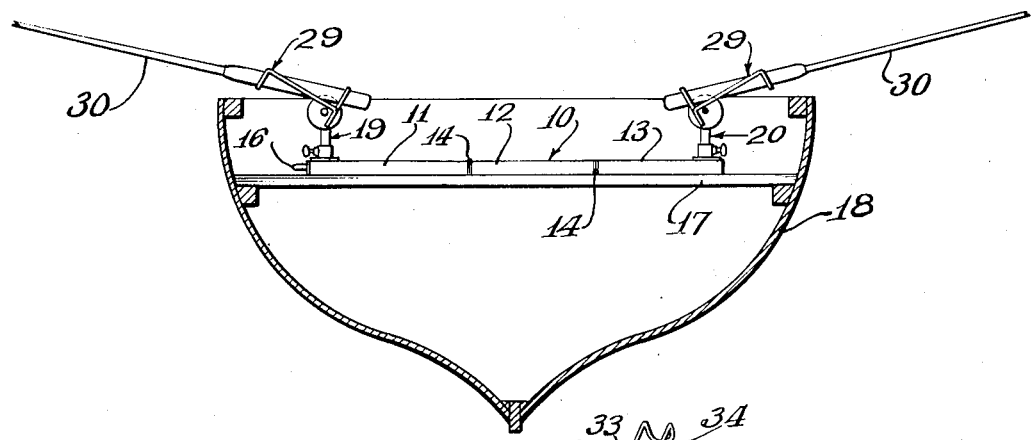
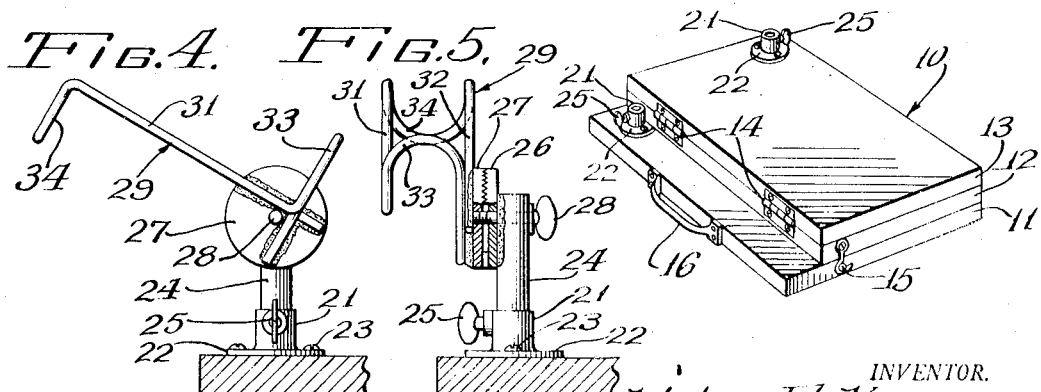
INVENTOR.
Victor F. Kroner
BY
Glenn S. Noble
Atty.

United States Patent Office 2,734,555
Patented Feb. 14, 1956

2,734,555
SEATS FOR USE BY FISHERMEN

Victor F. Kroner, Chicago, Ill.

Application May 22, 1952, Serial No. 289,240

2 Claims. (Cl. 155—131)

This invention relates particularly to foldable seats which may be easily carried by hand and adjusted for use.

Among the objects of the present invention are to provide a folding seat adapted for use either in boats or wherever convenient which may be readily collapsed or folded for carrying and which provides means for holding the fish pole supports proper in operative positions.

Other objects are to provide means for adding to the pleasure and convenience of fishing; to provide a simple and effective arrangement for holding a fish pole in various adjusted positions; and to provide such other advantages and improvements as will appear more fully hereinafter.

In the accompanying drawings illustrating this invention,

Fig. 1 is a somewhat diagrammatic view showing a boat in section with my seat and holders in position therein;

Fig. 2 is a perspective view of the foldable seat with the pole holders attached thereto;

Fig. 3 is a perspective view showing the seat in with the boards folded together for convenience in carrying;

Fig. 4 is an enlarged side view of the holder; and

Fig. 5 is a front view of the parts shown in Fig. 4.

As shown in these drawings, the seat 10 is formed of three boards or sections 11, 12 and 13 which are hingedly connected together by means of hinges 14 so that the several boards may be folded together as shown in Fig. 3 for convenience in carrying and are fastened in such folded position by means of catches 15. The board 11 is somewhat wider than the other boards and is provided with a handle 16 for carrying the same. In the present instance, the seat 10 which may be positioned in any convenient place for fishing is shown as being placed on the seat 17 of a boat 18 where the fishermen may readily rest upon the same and will hold the seat and connected parts in desired position.

This seat is shown as being provided with two fish pole holders 19 and 20, one being mounted on the board 11 and the other on the board 13 as shown. Each holder has a fixed socket 21 with an outwardly extending flange 22 which is fastened to the board by means of screws 23. Short shafts 24 are loosely mounted in the sockets 21 and may be held in adjusted position by means of set screws 25. These shafts, which are preferably tubular, are formed of any suitable material and are provided with two clutch discs 26 which may be secured thereto as by soldering or brazing. Each of these clutch discs has a complementary disc 27 associated therewith, these discs having coacting teeth in the form of crown gears so that the coacting members may be held in adjusted positions. The discs are held by means of bolts 28 which extend through the shafts or posts 24 and engage with the threaded hubs of the discs 27 as best shown in Figs. 4 and 5. Each of the discs 27 has a rod engaging member 29 for receiving the butt end of the fish pole or fish rod 30 which may be an ordinary bamboo pole or any other suitable fishing rod. The rod engaging member 29 is preferably formed of wire and consists of two branches 31 and 32 which are connected at their lower end by U-shaped upwardly extending loops 33 and are connected at their upper ends by downwardly extending semi-circular extending loops 34. These members are secured to the discs by being soldered or brazed thereto at their lower ends as shown in Fig. 4.

When the device is being carried, the parts are folded together as shown in Fig. 3 and the fish pole holders proper are removed therefrom by loosening the set screws 25 and withdrawing the shafts from the sockets. These holders may then be carried in any convenient manner while the folded seat is carried by the handle 16. When the device is to be used, the fisherman unfolds the boards and places the seat in any convenient position as on the cross seat of a boat as shown in Fig. 1, and inserts the holders in their respective sockets. The poles 30 may then be placed in the holders, the weight of the extending pole is such that the butt is pressed down against the loop 34 while the butt end presses up against the loop 33 which will hold the pole in adjusted position. It may be adjusted vertically by means of the clutch arrangement by loosening the bolt 28 and swinging the holder vertically to desired position. When it is again held by means of the bolt, the fish poles may then be adjusted in a horizontal plane by loosening the set screws 25 and swinging the pole around to any desired position and again tightening the set screw. If the fisherman desires to leave the seat, he may place a weight thereon which will hold the poles in adjusted positions as above described, or may fasten the seat down in any desired manner in order to hold the poles in position with the lines in the water.

From this description, it will be seen that I provide fish-pole supporting means which may be readily disassembled and folded for carrying and which may be readily put into use and will serve to hold one or more poles in various adjusted positions for fishing.

Having thus described my invention, what I claim is:

1. A light, foldable seat for the purposes set forth, formed of three boards or sections which are hingedly connected together by means of hinges so that the several boards may be folded together for convenience in carrying, catches for holding said boards in folded position, one of said boards being wider than the others, and a handle on said wider board for carrying the seat a fish pole holder positioned on the extended portion of the wider board and a fish pole holder secured to the outer end of the oppositely disposed board and arranged so that they will project upwardly on either side of the occupant when sitting on the seat, said boards being hinged so that they will be in substantially co-planar position when in use the three boards coacting to form a seat of sufficient width for a person sitting crosswise of the seat.

2. A light foldable seat adapted to be readily carried by a fisherman, formed of a center board and side boards, the side boards being hingedly connected to the center board by means of hinges so that the boards may be folded together for convenience in carrying, catches holding said boards in folded position, one of the side boards being wider than the other boards and a handle on the wider board for carrying the seat, said boards being hinged so that they are in co-planar position when extended, the several boards coacting to form a seat of sufficient width for a person sitting crosswise of the seat, a fishpole holder positioned on the extended portion of the wider board, and a fishpole holder secured to the outer end of the oppositely disposed board and arranged so that they will project upwardly on either side of the occupant sitting on the seat.

References Cited in the file of this patent

UNITED STATES PATENTS

| | | |
|---|---|---|
| 600,812 | Swanson | Mar. 15, 1898 |
| 1,223,884 | Johnstone | Apr. 24, 1917 |
| 1,551,241 | Dick | Aug. 25, 1925 |
| 2,184,583 | Danko | Dec. 26, 1939 |
| 2,264,744 | Dunnan | Dec. 2, 1941 |
| 2,466,361 | Bjornskaas | Apr. 5, 1949 |
| 2,528,768 | Marsh | Nov. 7, 1950 |
| 2,533,147 | Sparks | Dec. 5, 1950 |
| 2,564,625 | Jackson et al. | Aug. 14, 1951 |

FOREIGN PATENTS

| | | |
|---|---|---|
| 163,469 | Great Britain | May 18, 1921 |